US006466922B1

(12) United States Patent
Abumehdi

(10) Patent No.: US 6,466,922 B1
(45) Date of Patent: Oct. 15, 2002

(54) POSTAGE METER WITH REMOVABLE PRINT HEAD AND HAVING MEANS TO CONTROL ACCESS TO THE PRINT HEAD

(75) Inventor: Cyrus Abumehdi, Harlow (GB)

(73) Assignee: Neopost Limited, Romford (GB)

(*) Notice: Subject to any disclaimer, the term of this patent is extended or adjusted under 35 U.S.C. 154(b) by 0 days.

(21) Appl. No.: 09/070,023

(22) Filed: Apr. 30, 1998

(30) Foreign Application Priority Data

May 2, 1997 (GB) .......................................... 9709051

(51) Int. Cl.[7] .......................................... G06F 17/60
(52) U.S. Cl. .......................................... 705/410
(58) Field of Search .................... 101/91, 71; 235/101; 705/401, 408, 410, 60; 347/84, 85, 86, 87; 340/825.3, 825.31, 825.34

(56) References Cited

U.S. PATENT DOCUMENTS 3,869,986 A * 3/1975 Hubbard ...................... 101/91
4,922,817 A 5/1990 Holodnak .................... 101/91
5,049,727 A * 9/1991 Abellana et al. ............ 235/101
5,093,560 A 3/1992 Abellana .................... 235/101
5,106,321 A * 4/1992 Haroutel ..................... 439/310
5,163,366 A * 11/1992 Gregoire et al. .............. 101/91
5,170,705 A * 12/1992 Haroutel ...................... 101/91
5,188,025 A 2/1993 Murphy, III et al. ......... 101/91
5,427,023 A * 6/1995 Privin ......................... 101/91
5,458,431 A * 10/1995 Ferroel-Ragotin .......... 403/322
5,671,146 A * 9/1997 Windel et al. .............. 705/410
5,901,644 A * 5/1999 Etheridge et al. ............. 101/71

FOREIGN PATENT DOCUMENTS

EP 0547872 A2 6/1993

OTHER PUBLICATIONS

Haskin, David; "Home office Computing", v 18, n 1, p 95; DialogWeb copy pp. 1–7.*

* cited by examiner

*Primary Examiner*—Emanuel Todd Voeltz
*Assistant Examiner*—Thomas A. Dixon
(74) *Attorney, Agent, or Firm*—Shoemaker and Mattare

(57) ABSTRACT

A postage meter includes a printing device which is removable by a user of the postage meter. The printing device may be an ink-jet print cartridge including an integral ink supply. When the ink supply is depleted the ink-jet print cartridge must be replaced to enable further printing to be effected. The printing device has electrical contacts which interface with corresponding electrical connections of the postage meter when the printing device is mounted in the postage meter. In order to prevent unauthorized access to the print device, access to the printing device for replacement of the printing device is provided by means of an aperture in a housing of the postage meter and the aperture is closed by a member which can only be unlocked and opened in response to input of a coded signal to the postage meter.

7 Claims, 2 Drawing Sheets

POSTAGE METER WITH REMOVABLE PRINT HEAD AND HAVING MEANS TO CONTROL ACCESS TO THE PRINT HEAD

BACKGROUND OF THE INVENTION

This invention relates to postage meters in which a print head utilized for printing postage indicia is removably mounted on the postage meter.

Postage meters include electronic means for carrying out accounting functions in respect of postage values which it is desired to apply to mail items by operation of a printer. The electronic means also carries out control functions for operation of the postage meter including operation of the printer. The accounting and control is carried out in a secure manner by housing the electronic means in a secure housing in order to protect the integrity of accounting data generated by the accounting means and to prevent fraudulent operation of the postage meter. It will be appreciated that it is also necessary, or at least desirable, to ensure that the printer cannot be operated to print postage indicia in respect of values for which proper accounting has not been effected. Accordingly the printer is usually housed, together with the electronic means, in the secure housing.

Previously postage meters have been provided with a drum printer or a thermal transfer printer for printing the postage indicia. With the drum printer, ink for printing the postage indicia is supplied by means of a replaceable absorbent roller containing liquid ink which rolls in contact with print dies on the print drum. With thermal transfer printers, ink is supplied as a layer on a replaceable ribbon which is fed past a thermal print head for transfer of ink to the mail items. Both the ink roller and the ink ribbon are removable from the postage meter by a user of the postage meter for replacement by a new ink roller or ink ribbon respectively. With both of these types of printer, the printer per se is maintained secure by the secure housing. In the case of the drum printer, mechanical elements for setting the printing elements of the printer are not accessible by a user of the postage meter and in the case of a thermal transfer printer, electrical connections to the print head for control and operation of the print head are protected from access thereto.

It is now proposed, instead of drum printers or thermal transfer printers, to use ink jet printing devices. Ink jet print heads are already used widely as computer output printers where security of operation thereof is neither a problem nor required. The ink jet print heads manufactured and sold for use in computer output printers comprise a module including a row of ink jet nozzles and means for ejecting selectively ink from those nozzles. The module also includes electronic circuits for operation of the ink ejection means and an ink supply to supply ink to the nozzles to replenish ink ejected from the nozzles in printing. When the ink in the ink supply is exhausted the entire module including the nozzles and electronic circuits is removed and replaced by a new ink jet print head module. It will be appreciated that the module is provided with electrical connections which, when the print head module is mounted in the postage meter, interface with similar connections of the postage meter.

SUMMARY OF THE INVENTION

According to the invention a postage meter includes a printing device removable by a user of the postage meter; electrical connection means interfacing with electrical contacts on the printing device when the printing device is mounted in the postage meter; means barring access to said printing device and means responsive to an authorization signal to unlock the means barring access to permit removal and replacement of the printing device.

The printing device may be an ink jet printing device including an ink supply. The authorization signal may be obtained from a postal authority center in a communication routine between the postage meter and the postal authority center.

BRIEF DESCRIPTION OF THE DRAWING

An embodiment of the invention will be described hereinafter by way of example with reference to the drawings in which.

DESCRIPTION OF THE PREFERRED EMBODIMENT

Figure 1:
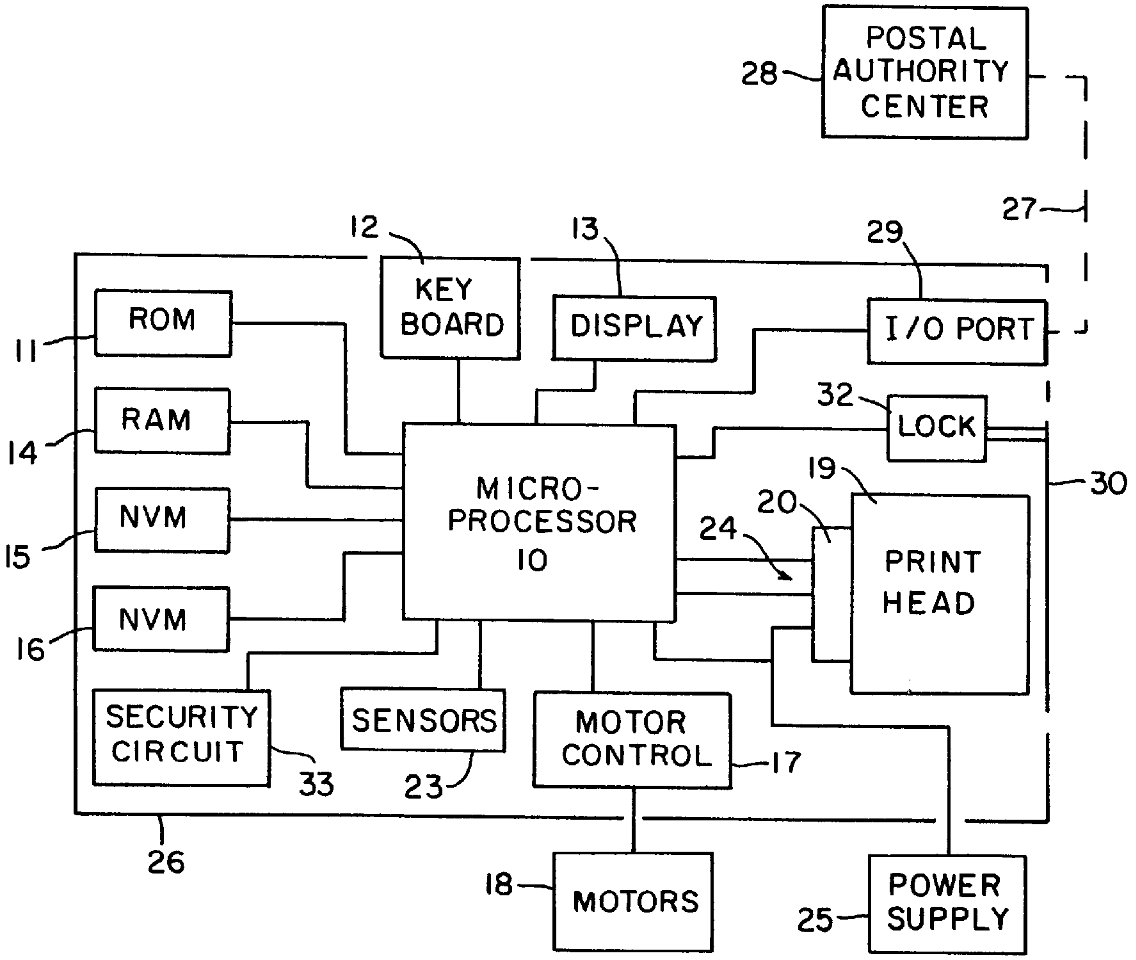
FIG. 1 is a block circuit diagram of a postage meter.

Referring first to FIG. 1 of the drawings, the postage meter includes electronic accounting and control means comprising a micro-processor 10 operating under program routines stored in a read only memory (ROM) 11. A keyboard 12 is provided for input of commands and data by a user and a display 13 is provided to enable display of information to the user. A random access memory (RAM) 14 is provided for use as a working store for storage of temporary data during operation of the postage meter. Non-volatile duplicated memories 15, 16 are provided for the storage of critical data relating to use of the postage meter and which is required to be retained even when the postage meter is not powered. The microprocessor 10 carries out accounting functions in relation to use of the postage meter for franking mail items with amounts of postage charges applicable to handling of the mail items by the postal authority or another carrier. Accounting data relating to use of the postage meter for printing franking indicia representing postage charges for mail items and any other critical data to be retained is stored in the non-volatile memories 15, 16. The accounting data includes a value of credit, an accumulated total of value used by the meter in franking mail items, a count of the number of mail items franked by the meter and a count of the number of mail items franked with a postage charge in excess of a predetermined value. The value of credit may be a value of credit available for use by the meter and stored in a descending credit register. The accumulated total value used by the meter is stored in an ascending tote register, the count of items is stored in a piece count register and the count of items franked with a postage charge in excess of a predetermined value is stored in a large items register. Alternatively, if desired, instead of a descending register storing a value of credit available for use by the meter, a total value of credit entered into the meter may be stored in an ascending credit register.

As is well known in the postage meter art, each of the registers referred to hereinbefore for storing accounting data is replicated in order to enable integrity of the accounting data to be maintained even in the event of a fault or termination of power to the meter during a franking operation. Two replications of each of the registers are provided in each of the memory devices 15, 16.

Figure 2:
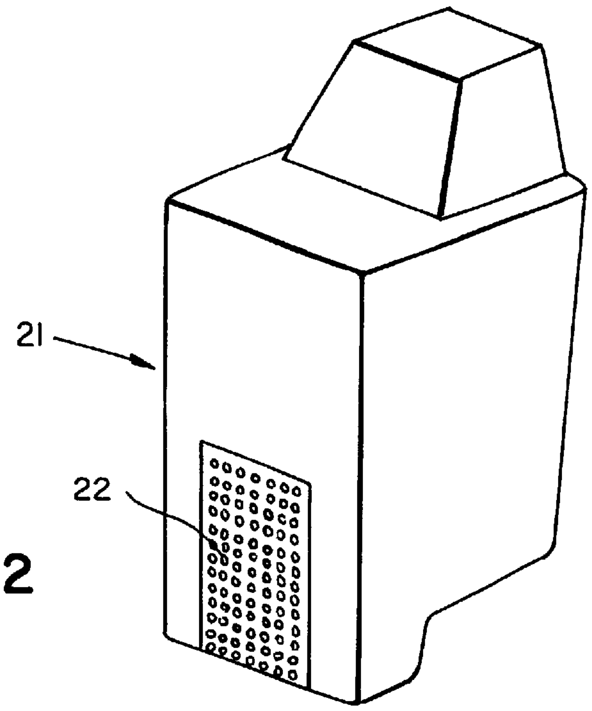
FIG. 2 illustrates a removable ink jet print head module.
Figure 3:
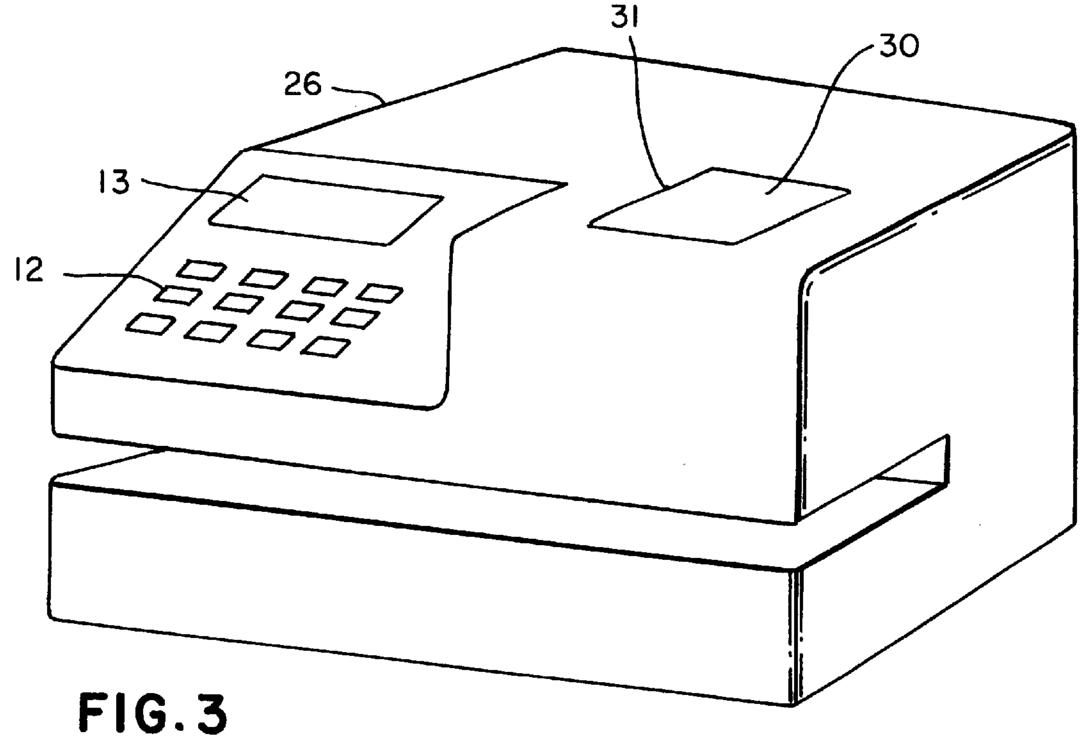
FIG. 3 illustrates a postage meter provided with a secure access to the print head module.

A motor controller 17 is controlled by the microprocessor 10 to control operation of motors 18 driving feeding means (not shown) for feeding a mail item past a stationery digital print head 19 or for moving the digital print head in a translational movement relative to a print receiving area of a stationary mail item. The digital print head 19 is a removable print head connected to the postage meter by means of a connector 20. The digital print head is preferably an ink jet print head constructed as a module 21 as shown in FIG. 2. The module is provided with a plurality of electrically conductive pads 22 which interface with conductive elements of the connector 20 when the module 21 is mounted in the postage meter. The connector 20 may be formed integrally with a ribbon cable 24 and conductive areas of the ribbon cable may be formed as the conductive elements of the connector 20 making electrical connection with the pads 22 of the print head module. The ink jet print head includes a plurality of ink ejection nozzles (not shown) from which ink may be ejected selectively by means of the operation of electronic circuits in the module. The module also contains a supply of ink to replenish ink ejected from the nozzles. The ribbon cable 24 includes a plurality of conductive tracks providing connections between the electronic circuits of the print head module and for providing electrical power from a power supply 25 to the print head module. Electrical power is supplied to the electronic circuits of the postage meter including the microprocessor, the print head module and the motor control from a power source 25.

Sensors 23 are provided to sense and monitor feeding of the mail item if the print head is stationary or to sense and monitor motion of the print head if the mail item is stationary. The sensors provide signals to the microprocessor to enable the microprocessor to control feeding of the mail item or motion of the print head and to output signals on the ribbon cable 24 to selectively operate the circuits in the print head module to eject ink droplets from the nozzles at appropriate times to create a required imprint on the mail item.

It will be appreciated, as is well known in the postage meter art, that the postage meter must operate in a secure manner and be protected from attempts to use the meter fraudulently for example by utilizing the postage meter to print franking indicia on mail items for which no corresponding postage charge has been accounted for by the accounting means. Accordingly those parts of the postage meter required to be secured against unauthorized tampering are housed in a secure housing 26.

In so-called prepayment operation of a postage meter, each time a franking operation is to be performed, the micro-processor carries out a routine in which a determination is made as to whether the value of credit in the credit register in NVMs 15, 16 is sufficient to permit the franking operation in respect of the required postage charge for a mail item to be performed. If the value of credit in the credit register is sufficient, the franking operation is continued and the accounting data in the registers is updated to account for the postage charge and the franking indicia is printed. However if the value of credit in the credit register is not sufficient to permit the franking operation in respect of the required postage charge to be performed, the operation is terminated and the franking indicia is not printed. Where a value of credit available for use in franking is stored in a descending register, the check as to sufficiency of the credit available is effected by a determination of whether the postage charge is less than the credit value. Where a total value of credit is stored in an ascending credit register the check as to sufficiency of credit is effected by a determination of whether the total value of credit is at least equal to the sum of the postage amount and the accumulated total value in the tote register.

As described hereinbefore, the print head module 22 includes an ink supply. Accordingly when the ink supply is exhausted the module 22 must be removed and replaced by a new module containing a full ink supply. Removal of the used module and replacement by a new module needs to be effected by a user of the postage whenever the ink supply becomes exhausted. As a result, if no protection is provided, access to the conductive elements of the connector 20 or to the electrically conductive pads 22 of the print head module 21 would be possible. Therefore it may be possible for anyone with a fraudulent intent to effect access to the conductive elements of the connector 20 or to the pads 22 of the module and thereby cause improper operation of the postage meter or print head. Printing of postage indicia for which accounting has not been carried out could be effected.

Accordingly in order to prevent attempts to operate the postage meter or print head fraudulently by gaining access to the electrical connections between the postage meter and the print head module, unauthorized access to the module is barred by the secure housing 26 and limited access only for replacement of the print head module is provided via an opening 31 in the secure housing which is closed by a hatch cover 30. Normally the cover is locked by an electronically operable lock 32. It will be appreciated that the opening permits only sufficient access to permit replacement of the print head module and the secure housing is so constructed as to prevent unauthorized access to any other part of the postage meter that is required to be maintained secure. In order for a user to gain access to the print head module for the purpose of replacement of the module, the cover 30 must be unlocked by entry to the postage meter of an authorization signal, for example a code. The code may be obtained from the postal authority by telephone communication by the user with the postal authority and then input to the postage meter by means of the keyboard 12. However it is preferred to provide a direct communication link 27 between the postage meter and a postal authority center 28. The meter is provided with an I/O port 29 for connection to the communication link 27. The cover may be locked by means of a lock which operates mechanically and automatically to secure the cover in a closed position when the cover is moved to the closed position. The lock may be unlocked to release the cover by means of the operation of a solenoid or motor under the control of the microprocessor 10. A sensor (not shown) responsive to the cover being in the closed position is provided to inhibit operation of the postage meter except when the cover is fully closed and locked in the closed position.

When a user desires to replace the module 21, the user operates the keyboard to put the meter into a module replacement routine. The microprocessor 10 carries out the routine which includes establishing communication with the postal authority center, receiving the code authorizing release of the lock, verifying that the code is authentic and then releasing the lock to permit opening of the cover and thence of access to the module for removal thereof. The routine may include the provision of register data to the postal authority. The register data preferably includes a count of the number of mail items processed by the meter since the previous replacement of the print head module. Thus the postal authority centre is enabled to check that the number of items processed or the time since the previous replacement is within acceptable limits. By the provision of the locked cover, the postal authority is able to withhold unlocking of the cover if previous operation of the postage meter has been unsatisfactory or if there is any suspicion of fraudulent use of the postage meter.

Messages sent by the postage meter to the postal authority may be sent in a secure manner. This may be effected by providing the postage meter with a security circuit 33 which may be encryption means operative to encrypt information to be contained in the message and then including the encrypted information in the message transmitted by the postage meter. Thereby the postal authority is enabled by encryption of the information or by decryption of the encrypted information to authenticate and verify that the information received in the message is correct and has not been tampered with or corrupted. Thus the postal authority can be assured that data, for example the register information, is correct and not corrupted. As an alternative to encryption of the information to be contained in the message, a digital signature based on the information may be generated by the security circuit 31 and included in the transmitted message. The postal authority may then use the digital signature to verify and authenticate the received message. Similarly any messages, including the coded signal, sent by the postal authority to the postage meter may include an encryption or digital signature to enable the postage meter to verify that the received message or code is authentic. The security circuit 31 may be operated by the microprocessor 10 to operate on the received message or coded signal and to utilize the encrypted information or the digital signature to verify and authenticate the received message or coded signal.

Hereinbefore a system providing only authorized access permitting replacement of a print head module has been described. However if desired the authorization of access may be in respect of other components or functions of the postage meter. Accordingly reference to replacement of a print head module is to be understood as including other components of the postage meter and to authorization of modification of functions of the postage meter.

I claim:

1. A postage meter including a printing device removable from the postage meter by a user of the postage meter; electrical connection means interfacing with electrical contacts on the printing device when the printing device is mounted in the postage meter; means barring access to said printing device and means responsive to an authorization signal to unlock the means barring access to permit removal and replacement of the printing device; wherein the printing device is located within a secure housing; said secure housing includes an access aperture for removal and replacement of the printing device; said means barring access includes a closure means for said aperture and the closure means has an open position permitting access through the aperture to the printing device for removal and replacement of the printing device and a locked closed position preventing access to the printing device; and including sensor means responsive to the position of the closure means and operative to permit operation of the postage meter for printing only in response to sensing that the closure means is in the locked closed position.

2. A postage meter including a printing device removable from the postage meter by a user of the postage meter; electrical connection means interfacing with electrical contacts on the printing device when the printing device is mounted in the postage meter; means barring access to said printing device and means responsive to an authorization signal to unlock the means barring access to permit removal and replacement of the printing device wherein the authorization signal is a coded signal and the postage meter includes means responsive to the coded signal to verify authenticity of the coded signal and in response to a determination that the coded signal is authentic to unlock the closure means to permit access to the printing device.

3. A postage meter as claimed in claim 2 wherein the authorization signal includes an encryption of information contained in the authorization signal.

4. A postage meter as claimed in claim 2 wherein the authorization signal includes a digital signature dependent upon information contained in the authorization signal.

5. A combination of a postage meter including accounting means and a printing device removably mounted to said postage meter and removable from the postage meter by a user of the postage meter; said postage meter including electrical connection means and said accounting means being operable to dispense postage and to output electrical signals to said electrical connection means to control operation of the printing device; said printing device including electrical contacts interfacing with said electrical connection means when the printing device is mounted in the postage meter to receive said electrical signals; said postage meter further including access means having a locked state barring access to said printing device and release means responsive to an authorization signal to release said access means from said locked state to permit removal of said printing device from the postage meter and to permit mounting of the printing device to the postage meter by said user.

6. A combination as claimed in claim 5 wherein the printing device comprises a printing module removable from the postage meter by the user of the postage meter, said module including an inkjet print head and ink supply means to supply ink to the inkjet print head.

7. A combination as claimed in claim 6 wherein the postage meter includes a housing and wherein the printing module when mounted to the postage meter is located within the housing; said housing including an access aperture for removal of the printing module from the postage meter and for mounting of the printing module to the postage meter; and the access means includes closure means lockable to prevent access to the printing module through the access aperture.

* * * * *